(12) United States Patent
Soni et al.

(10) Patent No.: US 11,074,430 B2
(45) Date of Patent: Jul. 27, 2021

(54) DIRECTIONAL ASSISTANCE FOR CENTERING A FACE IN A CAMERA FIELD OF VIEW

(71) Applicant: ADOBE INC., San Jose, CA (US)

(72) Inventors: Sachin Soni, New Delhi (IN); Siddharth Kumar, Utter Pradesh (IN); Ram Bhushan Agrawal, Noida (IN); Ajay Jain, Ghaziabad (IN)

(73) Assignee: ADOBE INC., San Jose, CA (US)

( * ) Notice: Subject to any disclaimer, the term of this patent is extended or adjusted under 35 U.S.C. 154(b) by 217 days.

(21) Appl. No.: 15/991,296

(22) Filed: May 29, 2018

(65) Prior Publication Data

US 2019/0370532 A1    Dec. 5, 2019

(51) Int. Cl.
*G06K 9/00* (2006.01)
*G06T 7/11* (2017.01)
*G06N 3/08* (2006.01)
*G06T 7/70* (2017.01)

(52) U.S. Cl.
CPC .......... *G06K 9/00268* (2013.01); *G06N 3/08* (2013.01); *G06T 7/11* (2017.01); *G06T 7/70* (2017.01)

(58) Field of Classification Search
None
See application file for complete search history.

(56) References Cited

U.S. PATENT DOCUMENTS

2018/0032031 A1* 2/2018 Du .......................... G03H 1/04
2018/0321738 A1* 11/2018 Jassal .................... G06F 3/012
2018/0352150 A1* 12/2018 Purwar ............. H04N 5/23293

FOREIGN PATENT DOCUMENTS

CN    104883486    *    9/2015    ............. H04N 5/225

OTHER PUBLICATIONS

Cool Blind Tech—Blind people can take amazing selfies with talkback and the camera app on pixel and nexus devices running Nougat 701 and higher, Dec. 14, 2016 (Year: 2016).*
Machine translation of reference CN 104883486 cited in privious action, 8 pages.*
Cool Blind Tech, Accessible Way to Take a Selfie Using TalkBack and Android Nougat 7.1, https://coolblindtech.com/accessible-way-to-take-a-selfie-using-talkback-and-android-nougat-7-1/, 18 pages.

* cited by examiner

*Primary Examiner* — Vikkram Bali
(74) *Attorney, Agent, or Firm* — Shook, Hardy & Bacon, LLP

(57) ABSTRACT

Methods and systems are provided for providing directional assistance to guide a user to position a camera for centering a person's face within the camera's field of view. A neural network system is trained to determine the position of the user's face relative to the center of the field of view as captured by an input image. The neural network system is trained using training input images that are generated by cropping different regions of initial training images. Each initial image is used to create a plurality of different training input images, and directional assistance labels used to train the network may be assigned to each training input image based on how the image is cropped. Once trained, the neural network system determines a position of the user's face, and automatically provides a non-visual prompt indicating how to center the face within the field of view.

18 Claims, 10 Drawing Sheets

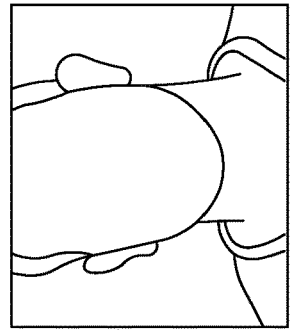
FIG. 4B. GO UP
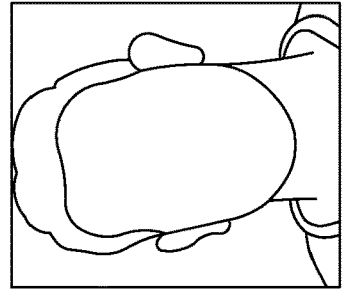
FIG. 4E. PERFECT
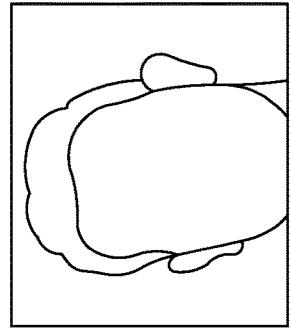
FIG. 4A. GO DOWN
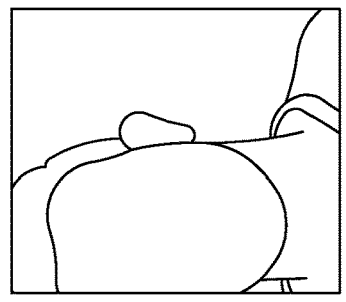
FIG. 4D. GO LEFT
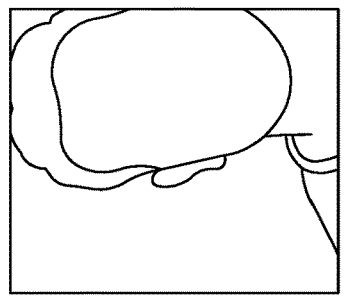
FIG. 4C. GO RIGHT
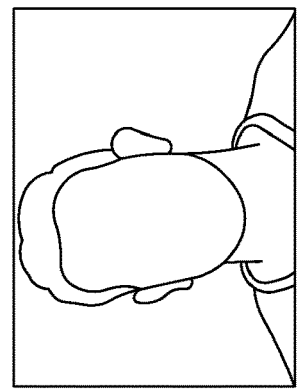
FIG. 3. ORIGINAL

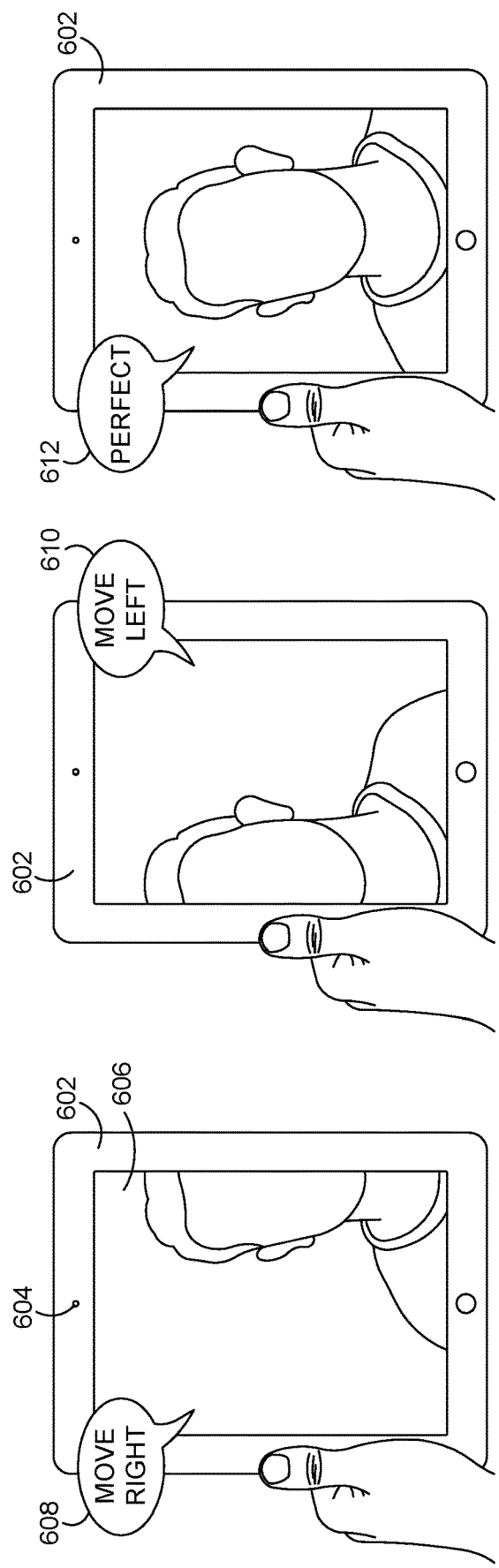

```
model = Sequential()
model.add(Conv2D(32, (3, 3), input_shape=input_shape))
model.add(Activation('relu'))
model.add(MaxPooling2D(pool_size=(2, 2)))

model.add(Conv2D(32, (3, 3)))
model.add(Activation('relu'))
model.add(MaxPooling2D(pool_size=(2, 2)))

model.add(Conv2D(64, (3, 3)))
model.add(Activation('relu'))
model.add(MaxPooling2D(pool_size=(2, 2)))

model.add(Flatten())
model.add(Dense(64))
model.add(Activation('relu'))
model.add(Dropout(0.5))
model.add(Dense(5))
model.add(Activation('sigmoid'))

model.compile(loss='categorical_crossentropy',
          optimizer='Adam',
          metrics=['accuracy'])
```

*FIG. 8.*

DIRECTIONAL ASSISTANCE FOR CENTERING A FACE IN A CAMERA FIELD OF VIEW

BACKGROUND

Many users look at a display screen showing a feed from a digital camera to determine whether the subject of a desired image or video is centered or even within the camera's field of view. Mobile devices now have front-facing cameras to allow a user to direct the camera at himself or herself while using the display screen to ensure the camera is capturing the user as desired. Users with visual impairments such as blurred vision or partial or complete blindness, however, cannot use the display screen to see what is being captured by the camera or determine how to adjust the camera's position to correctly capture the desired subject. Solutions exist that analyze facial features to determine whether a face is centered and what percentage of the face is being captured. But these solutions do not provide feedback to guide the user to the appropriate camera position. Additionally, these existing solutions fail to detect a subject when the subject's face is not within the field of view, and thus, do not work when the subject's face is out of view.

SUMMARY

Embodiments of the present invention are directed towards a system trained to provide directional assistance to camera users to guide the user to position the camera for centering a face within the camera's field of view. In accordance with embodiments of the present invention, such a system can be created using one or more neural networks. The one or more neural networks are trained to assist in providing directional assistance by determining a current position of a person's face within the field of view. For instance, a neural network may be trained to assign a frame to a particular category corresponding to a directional assistance prompt based on the current position of the person's face within the camera's field of view. In exemplary embodiments, the network is trained to classify image data into one of five directional assistance categories where four categories correspond to prompts directing the user to adjust the camera or the subject and one category corresponds to a prompt indicating a face is centered within the field of view.

Training of the neural network system is accomplished using a training data set of images. Each image in the training dataset is labeled with one of the categories corresponding to a directional assistance. The training dataset is used to train the neural network to assign a new input image to one of the categories. In exemplary embodiments, the training dataset comprises cropped images that are created from a smaller set of images, and the labels are assigned based on how the original image is cropped to form the particular training image. For instance, where there are five categories for providing directional assistance, an original image within the smaller set of images may be copied to create five training images, with a different portion of each copy being cropped to create each training image. The training images are input into the neural network system to generate directional assistance output, and the labels for each training image are compared to the directional assistance output for that image to determine errors, which are used to adjust the system to avoid similar errors in future iterations. Upon completion of training, the system may be used to determine a position of a subject's face within an unknown input image and automatically generate a non-visual directional assistance prompt to guide a user to center a face within a camera's field of view.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 3 depicts an example image from which training images may be created, in accordance with embodiments of the present disclosure;

FIGS. 4A-4E depict example cropped training images used to train the neural network system, in accordance with embodiments of the present disclosure;

FIGS. 6A-6C depict example outputs of the neural network system, in accordance with embodiments of the present disclosure;

FIG. 8 depicts an example neural network for providing directional camera assistance, in accordance with embodiments of the present disclosure

DETAILED DESCRIPTION

Figure 1:
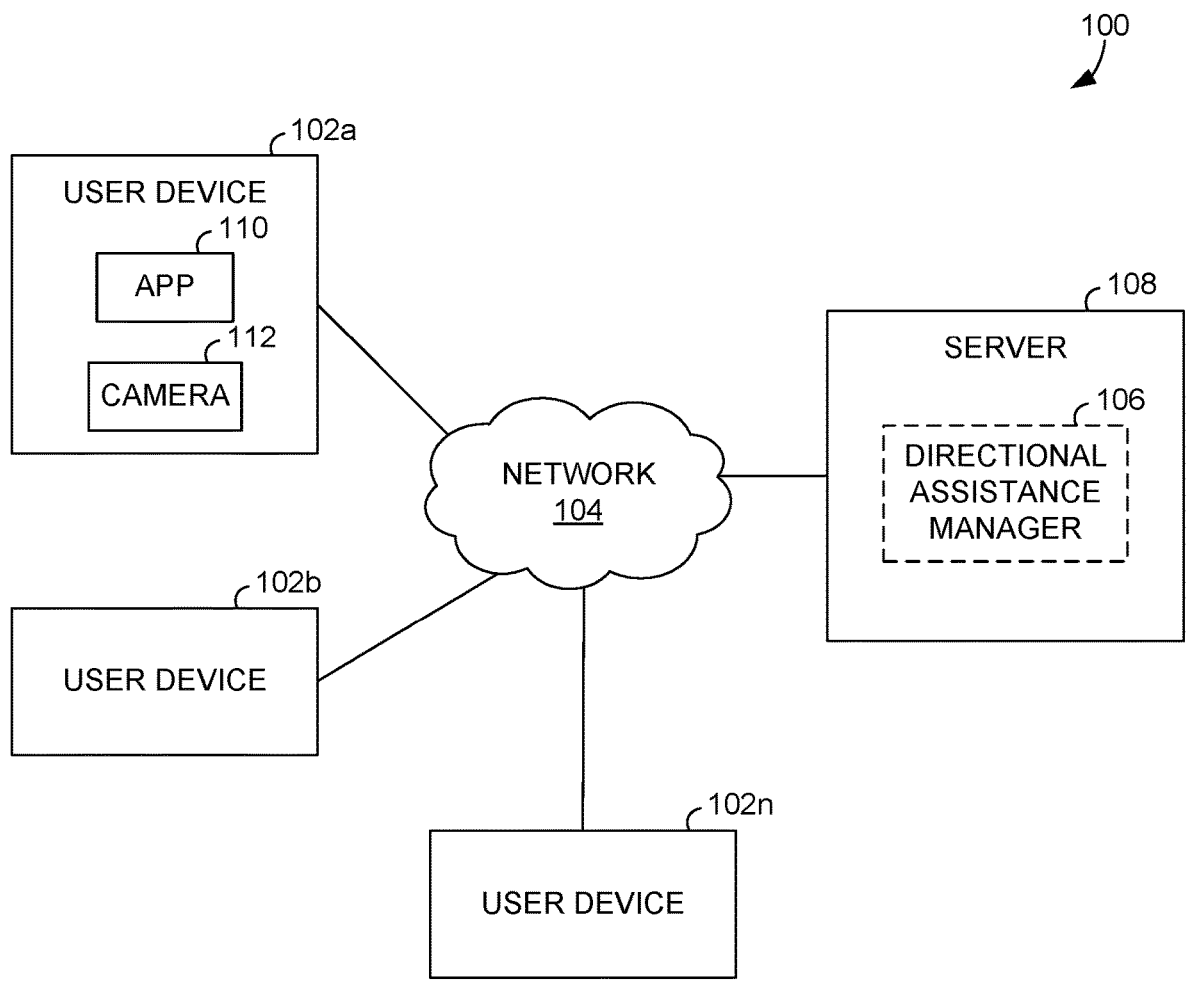
FIG. 1 depicts an example configuration of an environment in which one or more implementations of the present disclosure can be employed, in accordance with various embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

The term "image data" is used herein to refer to data captured from a camera. Image data may comprise video files or one or more photographs, including LDR and HDR image files. Image data may also be used to refer to a frame extracted from a video, including a recorded video or a video feed. Image data may comprise data captured by a camera and displayed on a user device in real time even if the data is not stored.

The term "training image" herein refers image data that is used for training a neural network in accordance with embodiments of the disclosure. The training image depicts at least part of a person and may depict all or part of a person's face. The training image may be a "cropped training image" or an "uncropped training image".

The term "uncropped training image" herein refers to an image that is cropped to create one or more training images. An uncropped training image is also referred to herein as an "original image" and an "initial image".

The term "cropped training image" herein refers to a training image that has been created by cropping another image and is used to train a neural network.

The term "field of view" herein refers to the entire view of an environment that is visible through a camera at a particular position and orientation is space. The field of view comprises what is captured in any given image. The field of view may also be referred to as "angle of view".

The term "directional assistance category" herein refers to a category of image data that indicates the position of a person's face within the field of view captured in the image data. The directional assistance category may indicate whether the face, or at least a center portion of the face, is centered within the field of view, to the right of the center of the field of view, to the left of the center of the field of view, above the center of the field of view, or below the center of the field of view. Image data may be assigned to a directional assistance category even if all or substantially all of the face is not within the field of view.

The term "directional assistance label" herein refers to a reference label associated with a training image when training the neural network. Each directional assistance label may correspond to a directional assistance category and may be automatically assigned to a training image based on how the region of the initial image that is cropped to form the training image.

Embodiments of the present disclosure are directed towards providing directional assistance to camera users to guide the user to center a face within the camera's field of view. Typically, users look at a display screen of a camera or a device with a built-in camera to see whether the subject of an image or video is centered or even within the field of view of the camera. Front-facing cameras are now provided on many mobile devices so that the camera and display screen are facing the same direction, enabling self-portrait photographs and videos, which are referred to as "selfies". Using the front-facing camera and display screen together allows a user to take an image or video of himself or herself while ensuring the user is centered or at least within the field of view of the camera. In this way, users can take selfies for personal use or to use as a live photograph when preparing an electronic form and can participate in video conferencing, for example.

However, users with visual impairments, such as blurred vision or partial or complete blindness, cannot use the display screen to see what is being captured by the camera or to determine how to adjust the position of the camera to correctly capture the desired subject. This limitation is present when taking selfies or video conferencing with a front-facing camera as well as when taking images with a rear-facing camera (i.e., a camera facing away from a display screen). Current accessibility features on mobile devices with cameras can determine the number of people within a frame, if the faces are centered, and what percentage of the screen is occupied by the face. These existing solutions recognize particular facial features, such as a person's eyes to determine whether the face is entered. However, by relying on select facial features to determine whether a face is centered, these programs cannot provide assistance when a face is completely or almost completely out of the camera's field of view. Additionally, the outputs of these solutions do not direct the user to the appropriate camera position. For instance, while an output indicating a face is "not centered" tells the user that the camera position needs to be adjusted, the user does not know how to adjust the camera to center the face.

Accordingly, embodiments of the present invention are directed towards a system trained to provide directional assistance to camera users to guide the user to position a camera for centering a face within the camera's field of view. The system uses one or more neural networks trained to provide directional assistance by determining a current position of a user within the field of view. For instance, a neural network is trained to assign a directional assistance category to a frame extracted from image data received by a camera. The directional assistance category corresponds to a directional assistance prompt that is output to a user based on the current position of a person, such as the user, within the field of view of the camera. In an example embodiment, the network is trained to assign a frame within received image data to one of five categories where four categories correspond to prompts with directions to adjust the camera position or the person and one category corresponds to a prompt indicating the face is centered within the field of view of the camera.

Training the neural network system is accomplished using a training dataset. Each image in the training dataset is associated with a directional assistance label representing a directional assistance category. The training dataset is used to train the neural network to determine a position of a face relative to the center of an input image by assigning the image to one of the categories. The training dataset comprises images with faces of individuals in different positions within the camera's field of view, such as being centered, to the right side, to the left side, to the top side, and to the bottom side. Further, some training images depict an individual in which the individuals' face is completely or almost completely cut off from the camera's field of view. By training the neural network with images in which the face is completely or almost completely cut off from view, directional assistance may be provided to guide a user even when the user's face is completely or almost completely out of the frame.

In some aspects, the training dataset comprises cropped images that are created from a smaller set of images and that are associated with directional assistance labels based on how the original image is cropped to generate the particular training image. For instance, where there are five categories for providing directional assistance, an original image from the smaller set of images is duplicated to create five copies of the images, and a different portion of each copy is cropped to create five different training images. The training images are input into the neural network system to output directional assistance categories, and the label associated with each training image is compared to the output for that image to determine any errors, which are used to adjust the system to avoid similar errors in future iterations.

Upon completion of training, the system may be used to determine a position of a person's face within a new input image, such as a frame extracted from a camera's video feed, and automatically generate a directional assistance prompt to guide a user to center a person's face within the camera's field of view. In exemplary embodiments, the directional assistance prompt comprises an audio output either with a direction for moving the camera or subject of the image or indicating a face is centered. For example, the trained system may provide an audio output of "Move Right" when the trained neural network detects that person's face is offset to the right of the center of the frame. When the image data is being continually received, such as in a video feed, the system may continue to provide directional assistance prompts based on additional frames until a frame is detected as showing the face is centered and a corresponding directional assistance prompt is given.

Example Computing Environment

FIG. 1 depicts an example configuration of an environment in which some implementations of the present disclosure can be employed to provide directional assistance for centering a face within a camera's field of view. It should be understood that the illustrated environment and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 11.

It should be understood that environment 100 shown in FIG. 1 is an example of one suitable operating environment. Among other components not shown, environment 100 includes a number of user devices, such as user devices 102a and 102b through 102n, network 104, and server(s) 108. Each of the components shown in FIG. 1 may be implemented via any type of computing device, such as one or more of computing device 1100 described in connection to FIG. 11, for example. These components may communicate with each other via network 104, which may be wired, wireless, or both. Network 104 may include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within environment 100 within the scope of the present disclosure. Each may comprise a single device or multiple devices cooperating in a distributed environment.

User devices 102a through 102n may be any type of computing device capable of being operated by a user. For example, in some implementations, user devices 102a through 102n are the type of computing device described in relation to FIG. 11. By way of example and not limitation, a user device may be embodied as a personal computer (PC), a laptop computer, a mobile device, a smartphone, a tablet computer, a smart watch, a camera, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device with a built-in camera or capable of being connected to a camera.

User devices 102a through 102n may include one or more processors and one or more computer-storage media. The computer-storage media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

Application 110 may generally be any application capable of facilitating the exchange of information between user devices 102a through 102n and the server(s) 108 in carrying out steps for providing directional camera assistance based on image data from the user devices 102 through 102n. In some implementations, application 110 comprises a web application that can run in a web browser and could be hosted at least partially on the server-side of environment 100. In addition, or instead, application 110 may comprise a dedicated application, such as an application having image processing functionality. In some instance, application 110 may be an application that provides for image editing, such as the Adobe Capture application, or video conferences, such as the Adobe Connect application. In another instance, application 110 may be an application dedicated to creating, managing, publishing, and/or updating electronic forms, such as the Adobe Experience Manager application or the Adobe Fill & Sign application. In some cases, application 110 is integrated into the operating system (e.g., as a service). It is, therefore, contemplated herein that "application" be interpreted broadly.

In accordance with embodiments herein, application 110 can facilitate providing directional assistance, using an input image, to guide a user in centering a face within a camera's field of view. To provide directional camera assistance, image data, such as an image captured by a camera, is received, and directional assistance is provided to the user through a prompt, such as an audio instruction, corresponding to a directional assistance category assigned to the image data. The image data may be received directly from a camera 112 integrated into or connected to user device 102a. Once a directional assistance category is assigned to the image data, a directional assistance prompt may be automatically generated and communicated through user device 102a, for example. In some instances, camera 112 captures and provides a live video feed such that the directional assistance category is assigned and output is provided in real time.

Additionally, when the image data is a live video feed, this process may be repeated on later received frames until the input frame is assigned a category corresponding to a centered face and a directional assistance prompt is given acknowledging the centered face.

As described herein, server 108 can facilitate providing directional assistance via directional assistance manager 106. Server 108 includes one or more processors, and one or more computer-storage media. The computer-storage media includes computer-readable instructions executable by the one or more processors. The instructions may optionally implement one or more components of directional assistance manager 106, described in additional detail below.

Directional assistance manager 106 trains and operates a neural network system to provide directional assistance for centering a face within a camera's field of view. The neural network system trained and operated by the directional assistance manager 106 may be comprised of one or more neural networks trained to generate designated output. For example, the neural network system may comprise a neural network trained to assign a directional assistance category to an input image.

At a high level, directional assistance manager 106 trains a neural network system to determine a position of a face within the field of view depicted in input image data and initiate a prompt based on the position. The input image data contains at least a portion of an individual who is an intended subject of an image or video. Analyzing the pixels of the input frame, the neural network system determines a probability of the image data belonging to one or more of the directional assistance categories, and based on an assigned directional assistance category, at least one non-visual directional assistance prompt is generated.

Prior to providing directional assistance based on new image data, the neural network system is trained using input images, referred to herein as training input images. Each training input image is labeled with one of the directional assistance categories. The training dataset comprises images with individuals in various different positions relative to the camera's field of view, such as being centered, to the right side, to the left side, to the top side, and to the bottom side. Further, some training images depict an individual in which the individuals' face is completely or substantially completely cut off from the camera's field of view. As described further with respect to FIGS. 4A-4E, in some embodiments, the training dataset comprise images cropped from a smaller set of images, and directional assistance category labels are assigned based on how the original image is cropped to from the particular training image. The training images are input into the neural network system to output directional assistance categories, which are compared to the directional assistance category labels associated with the input training images. The neural network system may be modified or adjusted based on the comparisons between the training output and the references such that the quality of subsequently generated output increases.

For cloud-based implementations, the instructions on server 108 may implement one or more components of directional assistance manager 106, and application 110 may be utilized by a user to interface with the functionality implemented on server(s) 108. In some cases, application 110 comprises a web browser. In other cases, server 108 may not be required. For example, the components of directional assistance manager 106 may be implemented completely on a user device, such as user device 102*a*. In this case, directional assistance manager 106 may be embodied at least partially by the instructions corresponding to application 110 and may be provided as an add-on or plug-in to application 110. Thus, it should be appreciated that directional assistance manager 106 may be provided via multiple devices arranged in a distributed environment that collectively provide the functionality described herein. Additionally, other components not shown may also be included within the distributed environment. In addition, or alternatively, directional assistance manager 106 may be integrated, at least partially, into a user device, such as user device 102*a*. Furthermore, directional assistance manager 106 may at least partially be embodied as a cloud computing service.

Figure 2:
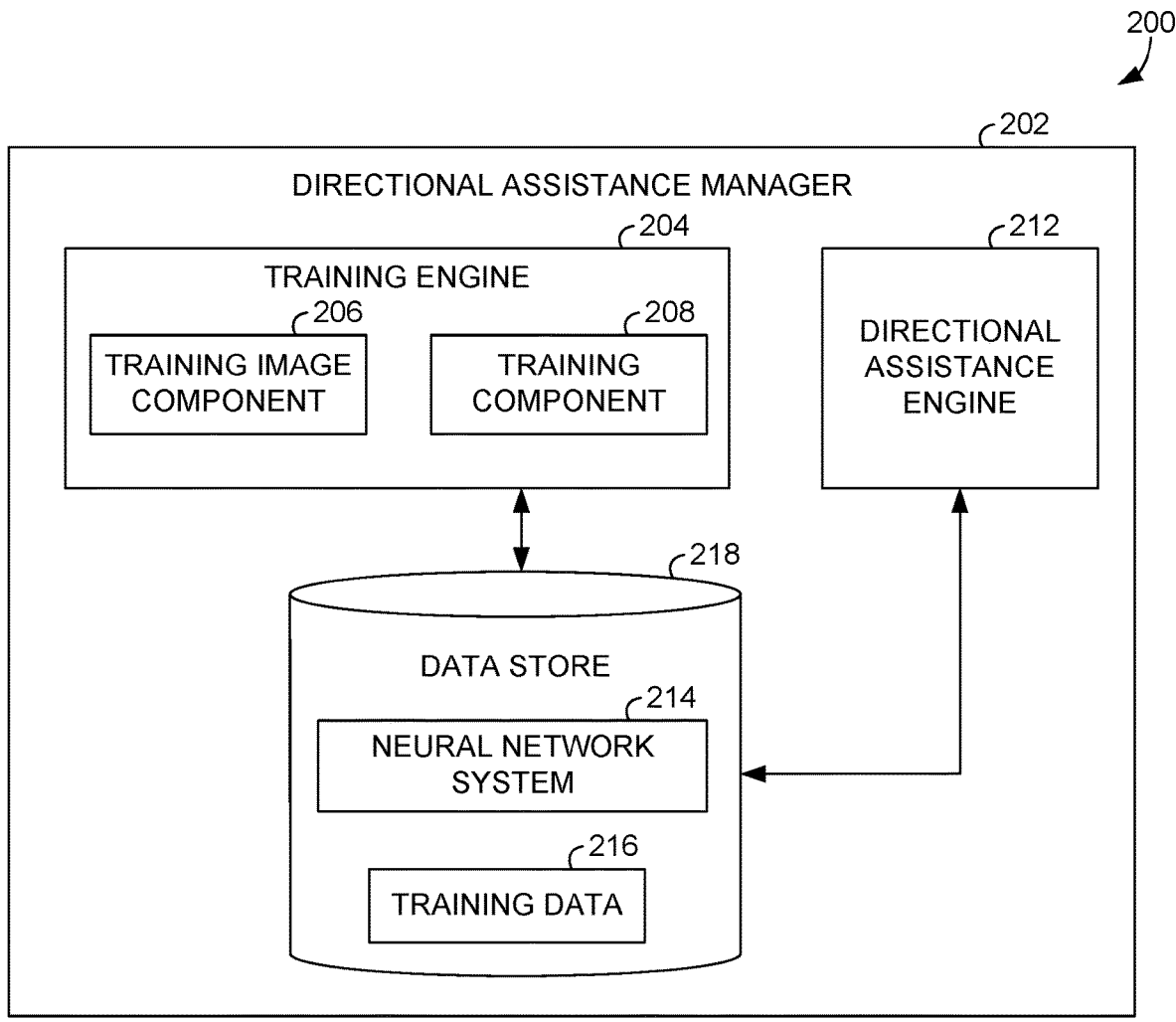
FIG. 2 depicts aspects of an illustrative directional assistance manager, in accordance with various embodiments of the present disclosure.

Referring to FIG. 2, aspects of an illustrative directional assistance system 200 are shown, in accordance with various embodiments of the present disclosure. Directional assistance manager 202 may include training engine 204, directional assistance engine 212, and data store 218. The foregoing components of directional assistance manager 202 may be implemented, for example, in operating environment 100 of FIG. 1. In particular, those components may be integrated into any suitable combination of user devices 102*a* and 102*b* through 102*n*, and server(s) 108, including directional assistance manager 106.

Data store 218 may store computer instructions (e.g., software program instructions, routines, or services), data, and/or models used in embodiments described herein. In some implementations, data store 218 stores information or data received via the various components of directional assistance manager 202 and provides the various components with access to that information or data as needed. Although depicted as a single component, data store 218 may be embodied as one or more data stores. Further, the information in data store 218 may be distributed in any suitable manner across one or more data stores for storage (which may be hosted externally or internally).

In embodiments, data stored in data store 218 includes training data 216. Training data generally refers to data used to train a neural network, or portion thereof. As such, training data 216 can include references (such as directional assistance category labels), training images, cropped training input images, uncropped training images, any transformed form of training images created in training the neural network (such as gray scale versions of training images), and output category labels. In some cases, directional assistance manager 202 receives data from user devices (e.g., an input image received by user device 102*a* or another device associated with a user, via, for example, application 110). In other cases, data is received from one or more data stores in the cloud. Data store 218 may also be used to store neural network system 214 comprising one or more neural networks.

Training engine 204 may be used to train neural network system 214 to determine a position of a user's face within the frame of view of an input image such as by assigning each input image to a directional assistance category. As depicted in FIG. 2, training engine 204 includes a training image component 206 and a training component 208. Although these components are illustrated separately, it can be appreciated that the functionality described in association therewith can be performed by any number of components.

Training image component 206 generates training input images that are to be fed into the neural network system 214 for training purposes. The training input images comprise images of individuals. In exemplary aspects, each training image depicts one person. The training image captures at least a portion of the individual, including the individual's face, a portion of the individual's face, or none of the individual's face. In some embodiments, each training image depicts multiple people with each person having all or part of the face within the training image. Further, the training input images may comprise LDR image types, such as a JPEG, or HDR images. The input images may be frames extracted from a video, including a recorded video stored in a database or a live video feed.

In implementations, the training image component 206 extracts the training input images from uncropped training images that each depict an individual's entire face. In this way, the training input images may be a portion of and cropped from an uncropped training image. Accordingly, "uncropped training image", as used herein, refers to an image prior to cropping for purposes of generating training input images. However, it is contemplated that the "uncropped training image" may have been cropped prior to further cropping for creating the training input images. Uncropped training image may also be referred to herein as an original training image or an initial training image.

In aspects, each uncropped training image is used to generate a plurality of training input images wherein the number of training input images generated is based on the number of directional assistance categories. For instance, in exemplary aspects, five training input images are created from one uncropped training image. Accordingly, an uncropped training image may be copied four times to create five copies, and each copy of the uncropped training image is cropped in a different region to create five different training input images. Each training image created from the same uncropped training image corresponds to one of the directional assistance categories.

FIG. 3 depicts an example uncropped training image 300, and FIGS. 4A-4E depict training input images that are created from different crops of the uncropped training image 300. Each of the training input images of FIGS. 4A-4E are created from a different region of the uncropped training image 300, and a directional assistance label, which is also referred to herein as a reference label, is assigned to each training input image based on the particular region cropped. For example, training input image 410 of FIG. 4A is a crop of the upper portion of uncropped training image 300. The lower portion of uncropped training image 300 is cropped out of training input image 410, resulting in the center of the face in the image to be lower than the center of the training input image 410. Training input image 410 is labeled "Go Down," indicating that the camera should be moved or tilted downwards to center the face within the image. Training input image 420 of FIG. 4B is a crop of the lower portion of uncropped training image 300 and is labeled "Go Up," indicating that the camera should be moved or tilted upwards to center the face within the image. Similarly, training input images 430 and 440 of FIGS. 4C and 4D, respectively, are crops of the left portion and the right portion, respectively, of the uncropped training image 300. Training input image 430 is labeled "Go Right," and training input image 440 is labeled "Go Left." FIG. 4E illustrates training input image 450 that is formed from a center portion of the uncropped training image 300, and the face captured in training input image 450 is substantially centered within training input image 450 such that the center of the person's face is substantially aligned with the center of the training input image 450. As used herein, a face is "substantially" centered when the center of the face unaligned with the center of the image by not more than 10%. Alternatively, in some embodiments, a face is "substantially" centered when a bounding box defining the face is entirely within the field of view of the image. Training input image 450 is labeled "Perfect", indicating that face is centered and the camera does not need to be moved. In the training input images in FIGS. 4A-4D, a portion of the face is cropped out; however, it is contemplated that training images corresponding to "Go Right", "Go Left", "Go Up", and/or "Go Down" labels may capture a person's entire face but the face is not centered. Similarly, the training images may not comprise any of the person's face but, instead, depict non-facial features of the person, such as the person's hair, ears, shoulder, neck, and the like.

The directional assistance categories illustrated in FIGS. 4A-4D correspond to how a camera should be moved so that the face is within the center of the camera's field of view. It is also contemplated that the directional assistance categories (and, consequently, the output prompts) are based on how a subject of the image should be moved. For instance, when a subject's face is to the right of the center of the field of view, a "Move left" category may be assigned and corresponding prompt may be initiated to indicate that the user should move left to center the subject's face. This prompt may be appropriate for indicating movement of the subject when the subject is the user using a front-facing camera or when a rear-facing camera is being used to capture another person's face. Further, as previously mentioned, at least some of the training images within the training data set depict an individual's face being completely or almost completely out of the camera's field of view.

Figure 5A:
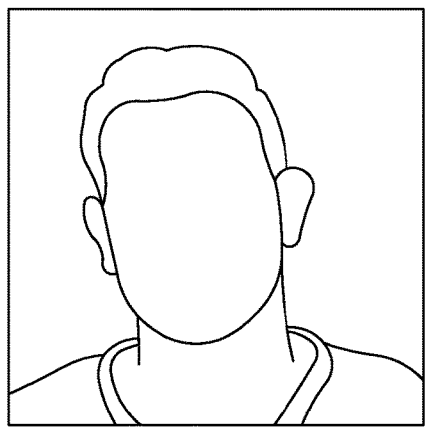
FIGS. 5A-5D depict an example process for creating a cropped training, in accordance with embodiments of the present disclosure.
Figure 5B:
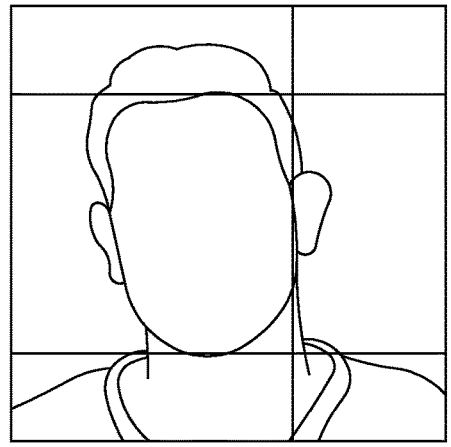
Figure 5C:
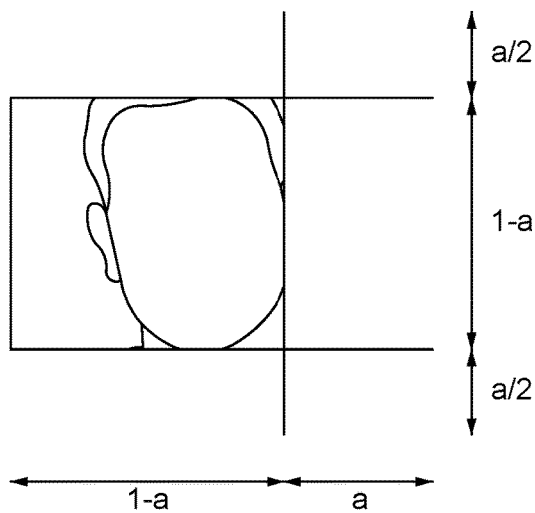
Figure 5D:
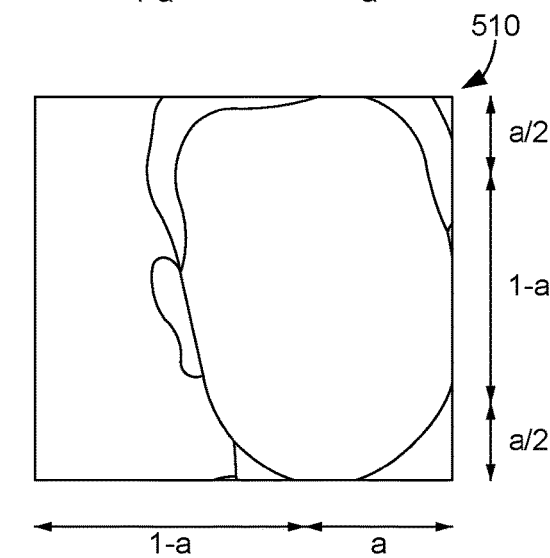

FIGS. 5A-5D illustrate a training input image that is created in accordance with an embodiment. FIG. 5A illustrates an uncropped training image 500 similar to the uncropped training image 300 of FIG. 3. Cropping the uncropped training image 500 utilizes a crop ratio (a), which is the ratio of length to be cropped out to the total side length, and the length of a resulting cropped image is equal to $1-\alpha$ of the length of the uncropped training image 500. As such, each resulting training image may have a width and a height equal to $1-\alpha$; however, the region of the uncropped training image 500 to which the crop ratio is applied differs for each resulting training image. FIGS. 5B-5D illustrate a cropped training image corresponding to a "Go Right" prompt such that the cropped training image is a crop of a left-side portion of the uncropped training image 500. Accordingly, the $1-\alpha$ width is measured from the left side of the uncropped training image 500, resulting in the length of a being cropped off from the right side. The $1-\alpha$ height of the resulting training image is centered along a vertical axis of the uncropped training images 500 such that a bottom $\alpha/2$ length and a top $\alpha/2$ length are cropped, as shown in FIG. 5C. By centering $1-\alpha$ for the height of a "Go Right" picture, the system may be indifferent to height. Lastly, the image is resized to the original size of the uncropped training image 500 to create the "Go Right" training input image 510, similar to training input image 430 of FIG. 4C. In some embodiments, the image is resized to 150×150 pixels.

Similarly, for a "Go Left" training input image, the length $1-\alpha$ extends from a right side of the image so that a left-side portion of the image is cropped off. For "Go Up" and "Go Down" images, the $1-\alpha$ length extends from one side of the vertical axis. For instance, for "Go Up", the $1-\alpha$ length extends from the bottom of the image, thereby cropping off a top portion, and for "Go Down", the $1-\alpha$ extends from the top of the image, cropping off a bottom portion. For "Go Up" and "Go Down" images, the $1-\alpha$ length for the width is measured in the center of image such that a right $\alpha/2$ portion and a left $\alpha/2$ portion are cropped off.

Generally, the greater amount of training data available, the more accurate the neural network can become. Accordingly, some aspects of the training image component 206 perform data augmentation, including modifying existing training images to create additional training images. Data augmentation techniques may include rotating images, mirroring images, changing color contrast levels, adjusting the overall brightness, and the like. In embodiments in which training input images are cropped images created from an uncropped training image, as described with respect to FIGS. 3-5E, data augmentation may occur prior to or after creating the cropped training input images.

In some embodiments, training input images are created in accordance with this method, and the images are divided into a training set and a validation set. In one embodiment reduced to practice, approximately 2000 images were generated for each directional assistance category, totally 10,000 images. A validation set included approximately 500 images (100 images per category), and the training data set comprised the remaining 9,500 images. After running the model for 15 epochs with a batch size of 10 images (for a total of 935 batches of training data), an accuracy of approximately 98% was achieved on the training data set and approximately 95% was achieved on the validation set.

As previously mentioned, when training the one or more neural networks in the neural network system, the training output that is generated is compared to references. As used herein, a reference refers to a standard, or ground truth, for evaluating the quality of the output generated by a neural network during training. In exemplary implementations, the training output includes a directional assistance category indicating a position of a person's face within the captured field of view. Accordingly, the references for each training input image is a directional assistance label identifying the directional assistance category to which the training input image properly belongs. In exemplary aspects, the directional assistance label (also referred to herein as a reference label) for a training input image is automatically assigned when the training input image is created. The reference label is based on the portion of the original uncropped training image that is used to generate the training input image. For instance, because training image 510 of FIG. 5D is a crop of the left portion of the uncropped training image 500 such that the right side is cropped out, a "Go right" reference label is assigned to the training image 510. In exemplary aspects, the training images are generated through an automatic cropping process for creating different crops each associated with a directional assistance category, and the references labels are automatically assigned to the resulting training images based on the directional assistance category associated with the particular crop. In alternative implementations, reference labels are manually assigned. A reference label may be stored as metadata for a particular training input image, and a referential table may be updated to reflect the reference label that is associated with the training input image.

Training component 208 uses training input images generated by the training image component 206 for training a neural network system. From a training input image, the neural network system generates a directional assistance output indicating a position of a person's face within the field of view, and the output is compared to a corresponding reference label. Based on this comparison, the training component 208 may adjust or modify the neural network system so that the neural network system becomes more accurate, and this process may be repeated for each training input image. The process of training the neural network system is discussed further with respect to FIG. 9.

The neural network system trained according to the present disclosure may be used to determine a position of a user's face within the field of view of new images input into the system. Providing directional assistance may be performed by the directional assistance engine 212 using the neural network system 214. Image data is provided to the directional assistance engine 212 to generate one or more directional assistance outputs corresponding to directional assistance categories assigned to image data. For example, select input frames from a live video feed from a camera may be automatically fed into the neural network system 214 to assign a directional assistance category to each frame. As used herein, an input frame generally refers to one or more frames extracted from a video, including a live video feed, or portion thereof. The input frame may comprise a LDR image, such as a JPEG image file, or may include a HDR image. The image data, such as the image frame, may depict at least a portion of an individual who is an intended subject of an image or video. The image data may include all of the individual's face, a portion of the individual's face, or none of the individual's face.

An audio or other non-visual output may be automatically generated for each determined directional assistance category, such as "Go Right" or "Perfect". The output indicating the directional assistance category may be provided in real time to allow a user to make the appropriate adjustments to the camera position and/or the position of the intended subject of the image, which may be the user's self. FIGS. 6A-6C depict directional assistance outputs being generated in accordance with embodiments of the present invention. In FIGS. 6A-6C, an individual is taking a selfie using a mobile device 602 with a front-facing camera 604 designed to capture images from the same side of the display screen 606 of the mobile device 602. FIG. 6A depicts the individual's face offset to the right side of the camera's field of view. A frame from the image data received from the camera is assigned, using a trained neural network system, a "Move Right" directional assistance category, which is associated with images in which the subject's face is off-centered towards the right side. A first audio prompt 608 of the phrase "Move Right" is automatically generated to instruct the user to move the device 602 to the right or to turn the device to the right. After the user makes an adjustment, the user's face may still not be centered, and additional prompts may be given. FIG. 6B, for instance, shows the user moved the camera too much to the right in response to the first prompt 608, resulting in the user's face to be off-centered to the left side of the camera's field of view. Accordingly, a new directional assistance category (i.e., "Move Left"), and a corresponding second audio prompt 610 is automatically generated instructing the user to move the camera to the left or turn the camera towards the left side. Once the user's face is determined to be centered, a third audio prompt 612 may be given (e.g., "Perfect"), indicating that the user's face is centered, as illustrated in FIG. 6C.

Figure 7:
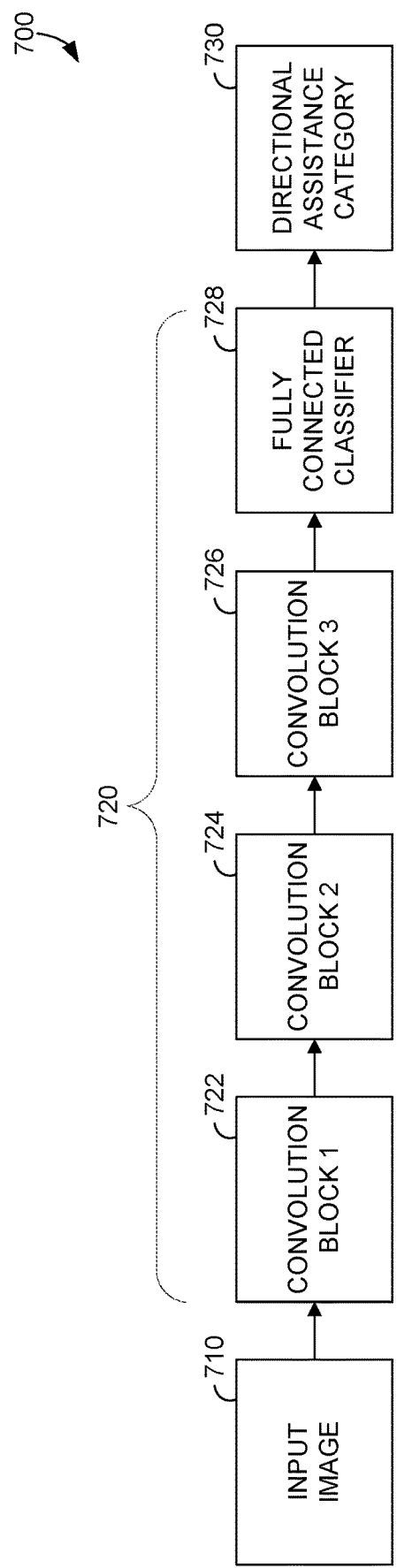
FIG. 7 depicts an illustrative neural network system for providing directional camera assistance, in accordance with embodiments of the present disclosure.

Turning to FIG. 7, an illustrative architecture for a neural network system 700 used for providing directional camera assistance is provided. Neural network system 700 comprises a convolutional neural network 720 comprising three convolution blocks 722, 724, and 726 and a fully-connected classifier 728. Each convolution block comprises one or more convolution layers and one or more max pooling layers, and the fully-connected classifier 728 comprises two fully-connected layers. Each convolution layer in convolution blocks 722, 724, and 726 may be followed by an activation layer with an exponential linear unit, such as a sigmoid activation layer.

As one of ordinary skill in the art may appreciate, each layer within the network 720 comprises a plurality of neurons, and each neuron can be tuned to increase the overall accuracy of the system 700 when training data is provided. In this way, the training data provides a correct answer to the convolutional neural network 720 and its neurons such that over time, the convolutional neural network 720 can begin tuning the computations computed within each neuron to eventually find a correct answer on its own. As such, any one or more neural network neurons of the convolutional neural network 720 can be modified based, at least in part, on received training image data.

An input image 710 is fed to the first convolution block 722, and the outputs of each convolution block are fed to the next architectural layer. The fully-connected classifier 728 outputs a directional assistance determination, such as a probability of the image being a particular directional assistance category. The output directional assistance category 730 may comprise the category in which the training input image has the highest probability of belonging. During training, input image 710 comprises a training input image, such as one of training input images 410, 420, 430, 440, or 450 of FIGS. 4A-4E. The output directional assistance category 730 is compared to a reference directional assistance category previously associated the input training image 710 to determine errors between the output of the neural network 720 and the references. Such errors are then fed back through the neural network system 700 to appropriately train the neural network 720, for example, by adjusting the weight of the network connections to reduce the value of the errors. This process can be repeated for a sufficiently large number of training cycles until the neural network system 700 converges to a state where the error of the calculations is small enough that the output reaches a desired threshold level of similarity to the reference labels.

Once the convolutional neural network 720 is trained, input image 710 may comprise an image that does not have an associated directional assistance label, such as a frame extracted from a live video feed, and the convolutional neural network 720 outputs a directional assistance category 730 that is the category with the highest probability for the input image 710. FIG. 8 depicts an example embodiment of a neural network, such as convolutional neural network 720, that was reduced to practice.

Example Flow Diagrams

Figure 9:
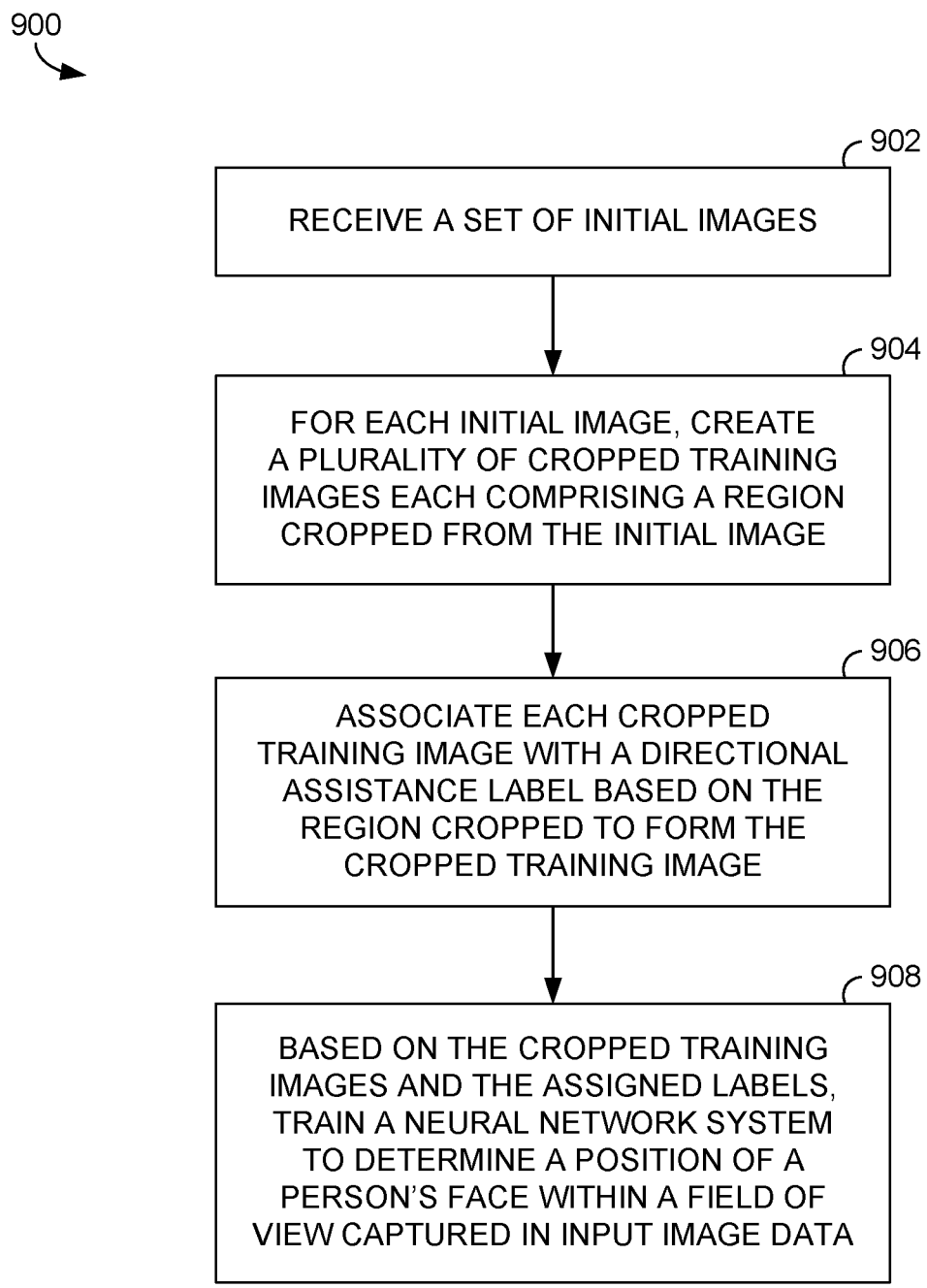
FIG. 9 depicts a flow diagram showing a method for training a neural network system to provide directional camera assistance, in accordance with embodiments of the present invention.

With reference to FIG. 9, a flow diagram is provided to show an embodiment of a method 900 for training a neural network, such as convolutional neural network 720 of FIG. 7, for example, to provide directional camera assistance based on an input image, in accordance with embodiments of the present invention. Method 900 may be performed, for example, by training engine 204 of directional assistance manager 202, as illustrated in FIG. 2.

At block 902, a plurality of training images are received. These images may be received from a data store, such as data store 218 of FIG. 2. In exemplary aspects, each training images, which may be referred to as an original or initial training image, depicts one person and depicts the person's face. In some aspects, each initial training image depicts an entire face of a person. At block 904, a plurality of cropped training images are created from each training image. Each cropped training image is associated with a cropped region of a training image. Accordingly, the cropped training images may be generated by creating copies of an initial training image, cropping different regions of the initial training image for each copy, and resizing each resulting cropped training image to the size of the initial training image as described with respect to FIGS. 5A-5D. For example, the cropped training images created from each initial image may comprise an image with a left portion of the initial training image cropped; (b) an image of a right portion of the initial training image cropped, (c) an image of a top portion of the initial training image cropped, (d) an image of a bottom portion of the initial training image cropped; and (e) an image of a central region of the initial training image. One or more of these cropped training images may depict a portion of a person's face. Further, at least some of the cropped training images may be a crop in which the person's face is completely or almost completely cropped out. The cropped training images may comprise non-facial features of the person, such as the person's hair, ears, neck, shoulders, and the like.

At block 906, a directional assistance reference label is associated with each cropped training image. The reference label associated with a particular cropped training image is determined based on the particular cropped region of the initial training image that was used to create the cropped training image. All cropped training images created from the same training image are associated with different reference labels. In exemplary aspects, the reference labels include "Go right", "Go left", "Go up", "Go down", and "Perfect" as discussed with respect to FIGS. 3 and 4A-4E. The cropped training images may be automatically associated with directional assistance reference labels as the cropped training images are being created.

At block 908, a neural network system is trained to determine the position of a person's face (also referred to herein as the subject's face) within a field of view captured in the image data. The neural network system is trained using the cropped training images and the associated directional assistance reference labels. The neural network may comprise a convolution neural network with three convolution blocks and a two fully-connected classifier layers as depicted in FIG. 7 and trained as discussed with respect to training component 208 of FIG. 2. Accordingly, each cropped training image is input into the neural network system to determine the position of the person's face within the field of view of that particular training image. In exemplary aspects, this determination is made by classifying the cropped training image into a directional assistance category that indicates the position of the person's face relative to the center of the field of view. The training directional assistance output of the neural network, such as the directional assistance category, is compared to the directional assistance reference label associated with the cropped training image. Based on errors determined from these comparisons, the neural network is adjusted to increase accuracy for future iterations.

These comparisons of the generated output determinations and the reference labels may include determining one or more loss function types. For example, the comparison between a training directional assistance output and an associated reference label may include determining cross-entropy as a loss function. It is contemplated that other types of loss functions may be used including, for instance, an adversarial term, an L2/L3/L4/Ln loss, a masked loss, a render loss, and the like. In some embodiments, Adam optimizer is used for the loss function minimization over an entire training set.

In some embodiments, the neural network is trained to provide directional assistance for centering a face when there are multiple faces or at least portions of multiple faces within an image. In this case, the neural network may be trained with training images having a least portion of multiple faces. The position of each face within the image relative to a center may be determined in a similar manner as described above except the threshold for a substantially centered face may be different for images with multiple faces. For example, in some aspects, the faces are considered centered when a bounding box for each detected face is within the field of view. Alternatively, the neural network may be trained to identify whether a center of a group of faces, which may not necessarily be a center of an individual face, is aligned with the center of the field of view. For instance, if two faces are detected within an input image, a midpoint between the two faces may be determined to be either centered or off-centered in a specific direction.

Figure 10:
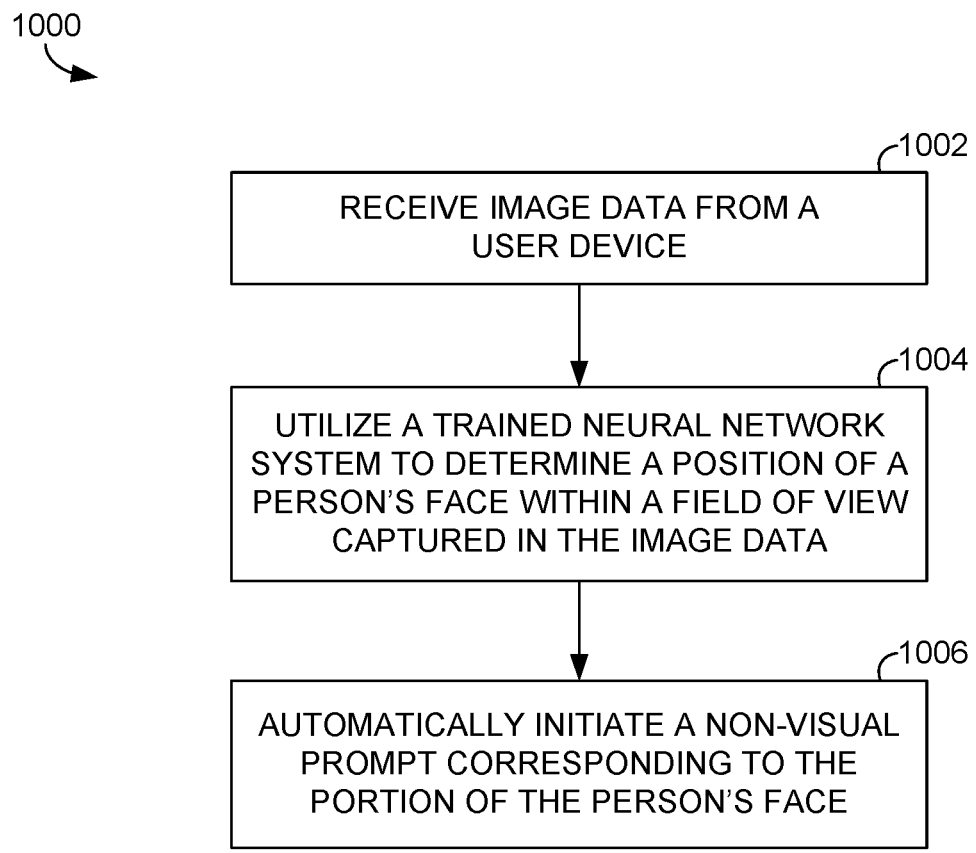
FIG. 10 depicts a flow diagram showing a method for providing directional camera assistance, in accordance with embodiments of the present invention.

FIG. 10 depicts a block diagram illustrating an example method 1000 for providing directional camera assistance. Method 1000 may be performed, for example, by directional assistance engine 212 of the directional assistance manager 202 of FIG. 2. Additionally, method 1000 may be performed utilizing neural network system 700 of FIG. 7 after the system has been trained.

At block 1002, image data is received from a user device. The image data may comprise a frame extracted from a video feed of a camera and depict at least part of a person. The image data may be automatically received in real time, and the image data may be displayed on a display screen of the user device. In other embodiments, the image data is received from a data store, such as data store 218, or may be received directly from a user's input such as through uploading an image from a camera or inputting a like or URL to an image.

At block 1004, a trained neural network system is used to determine the position of the person's face within the field of view captured in the image data. The position of the person's face within the field of view may be determined by classifying a frame within the image data to a directional assistance category that indicates a directional relationship between a user's face and a center region of a frame within the image data, which represents the center of a camera's field of view. The directional assistance category may be selected from a plurality of categories, including move right, indicating a camera needs to be moved a distance to the right to capture the subject's face in the center region of the frame; move left, indicating the camera needs to be moved a distance to the left to capture the subject's face in the center region of the frame; move up, indicating the camera needs to be moved a distance upward to capture the subject's face in the center region of the frame; move down, indicating the camera needs to be moved a distance to the right to capture the subject's face in the center region of the frame; and centered, indicating the subject's face is centered or substantially centered within the frame. The neural network determines a probability of the image data belonging to each directional assistance category, and the assigned category is the one with the highest probability for that image data.

The neural network system is trained to determine the position of the person's face within the field of view using features identified from pixels within the image data. The features may include facial features of a person, but the features also include non-facial facials, allowing the system to assign a category even if the person's face is not captured within the image data.

At block 1006, a non-visual prompt corresponding to the position of the person's face is automatically initiated to guide a user to center the person's face within the field of view of the camera. As such, the non-visual prompt may be an instruction for repositioning the camera. The non-visual output may comprise an audio message and/or tactile feedback, such as vibrations. For instance, if the image data captures a person's face that is off-centered to the right side of the camera's field of view, and audio prompt of "Move right" may be automatically generated to instruct the user to move the camera to the right. One or more visual outputs may also be provided with the non-visual output.

As mentioned, the image data may comprise a video feed, and every n number of frames from the video feed may be automatically assigned a directional assistance category, allowing the user to receive directional assistance feedback in real time. In some embodiments, every $20^{th}$ frame of video captured is input in the neural network system to determine a directional assistance category. Frames from the video data may continue to be assigned directional assistance category until a face is determined to be centered. In some embodiments, directional assistance categories are assigned to frames at an initial frame rate until a centered category is assigned to a frame, and after the centered category is assigned, a new frame rate that is lower than the initial frame rate may be used while image data is continuing to be received. In some embodiments, directional assistance continues to be performed at the initial or reduced rate but output prompts are only initiated when a user is no longer centered. In other embodiments, directional assistance is turned off after a centered (e.g., "Perfect") category is determined. Additionally, directional assistance may be initiated upon a user command. For example, when setting up a camera for a video conference, a user may achieve a centered category assignment, which may turn off the directional assistance or reduce the rate of the directional assistance so prompts are not continued to be given to the user. If the user later moves, the user may input an indication to receive directional assistance so the user's face can be re-centered within the camera's field of view.

Example Operating Environment

Figure 11:
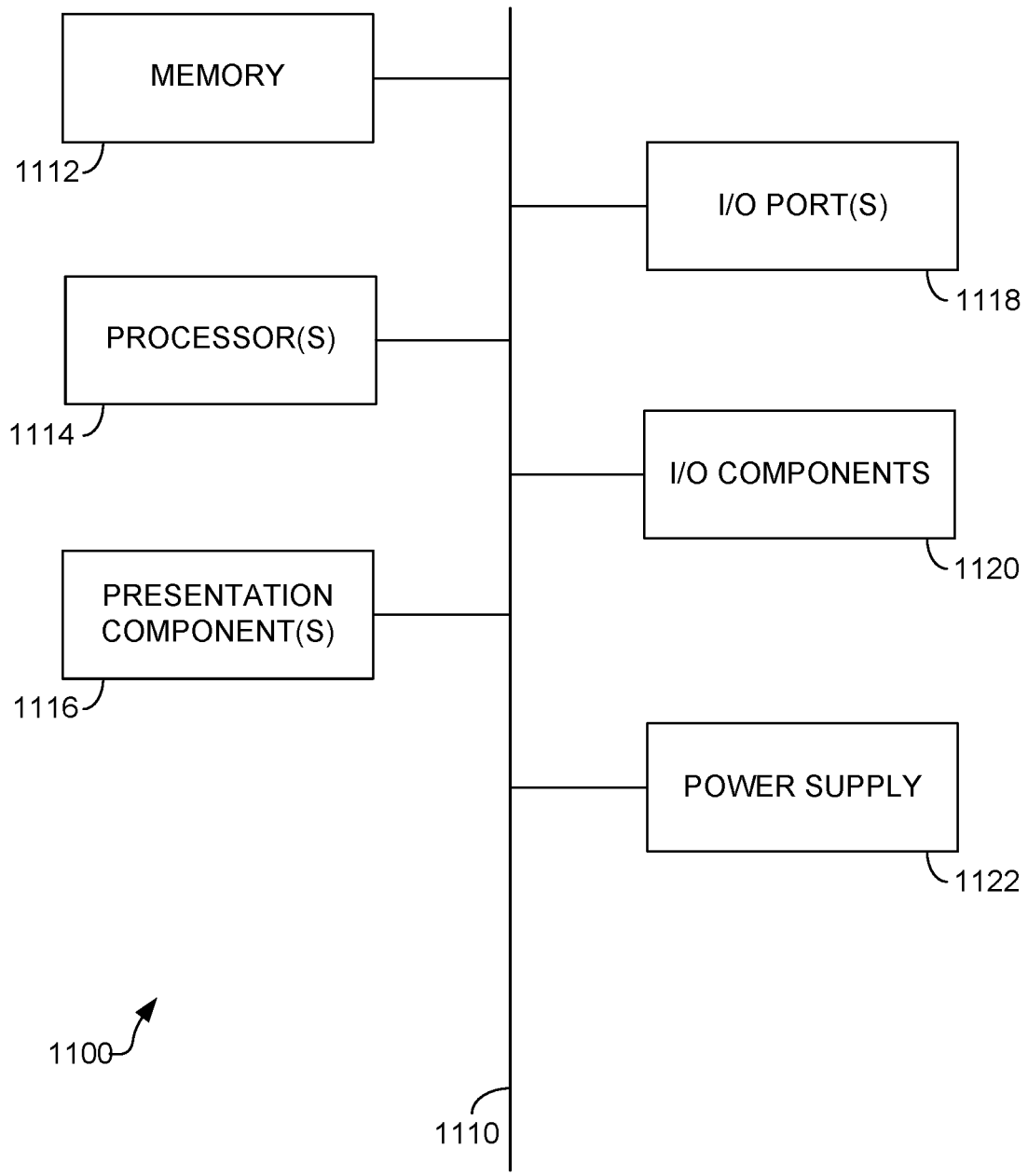
FIG. 11 is a block diagram of an example operating device in which embodiments of the present disclosure may be employed.

Having described an overview of embodiments of the present invention, an exemplary operating environment in which embodiments of the present invention may be implemented is described below in order to provide a general context for various aspects of the present invention. Referring now to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/ output (I/O) ports 1118, input/output components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. As used herein, computer storage media does not comprise non-transitory media such as signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be equipped with depth cameras, such as stereoscopic camera systems, infrared camera systems, RGB camera systems, touchscreen technology, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

What is claimed is:

1. One or more non-transitory computer-storage media having a plurality of executable instructions embodied thereon that, when executed by one or more processors, cause the one or more processors to perform a method comprising:
   receiving image data from a user device;
   utilizing a trained neural network system to determine a directional assistance category based on a frame within the image data, the directional assistance category indicating a position of a person's face relative to a field of view of the frame, wherein the directional assistance category for the frame is determined based on at least one non-facial feature of the person depicted in the frame, the non-facial feature comprising at least one of hair, an ear, a shoulder, and a neck; and
   automatically initiating a non-visual output corresponding to the position of the person's face relative to the field of view.

2. The media of claim 1, wherein the directional assistance category indicates where a center of the person's face is positioned relative to a center of the field of view depicted in the frame.

3. The media of claim 2, wherein the directional assistance category is selected from one of the following:
move right, indicating the center of the person's face is positioned to the right of the center of the field of view;
move left, indicating the center of the person's face is positioned to the left of the center of the field of view;
move up, indicating the center of the person's face is positioned above the center of the field of view;
move down, indicating the center of the person's face is positioned below the center of the field of view; and
centered, indicating the center of the person's face is aligned with the center of the field of view.

4. The media of claim 1, wherein the person's face is not within the field of view depicted in the frame.

5. The media of claim 1, wherein the non-visual output comprises an audio instruction to guide a user to reposition a camera associated with the user device.

6. The media of claim 5, wherein the camera is a front-facing camera of the user device and the face belongs to a user of the user device.

7. The media of claim 1, wherein the image data comprises a video feed and the frame is extracted from the video feed.

8. The media of claim 7, wherein the method comprises extracting a second frame from the video feed and determining a second directional assistance category indicating that the person's face is centered within the field of view of the second frame.

9. The media of claim 8, wherein the frame is assigned to the directional assistance category and the second frame is assigned to the second directional assistance category at an initial frame rate, wherein after the second frame is assigned to the second directional assistance category, additional frames from the video feed are extracted and assigned additional directional assistance categories at a second frame rate that is lower than the first frame rate.

10. The media of claim 8, wherein the frame is assigned to the directional assistance category and the second frame is assigned to the second directional assistance category at an initial frame rate, wherein after the second frame is assigned to the second directional assistance category, additional frames are not assigned to any directional assistance categories until an indication to provide directional assistance is received.

11. The media of claim 1, wherein the trained neural network is trained using a training dataset comprising cropped images created by cropping initial images from an initial image dataset, each initial image being cropped in different regions utilizing a crop ratio to create a plurality of cropped images.

12. A computer-implemented method for providing directional assistance for imaging, the method comprising:
receiving image data from a user device;
utilizing a trained neural network system to determine a directional assistance category based on a frame within the image data, the directional assistance category indicating a position of a person's face relative to a field of view of the frame, wherein the directional assistance category for the frame is determined based on at least one non-facial feature of the person depicted in the frame, the non-facial feature comprising at least one of hair, an ear, a shoulder, and a neck; and
automatically initiating a non-visual output corresponding to the position of the person's face relative to the field of view.

13. The computer-implemented method of claim 12, wherein the directional assistance category is selected from one of the following:
move right, indicating a center of the person's face is positioned to the right of a center of the field of view;
move left, indicating the center of the person's face is positioned to the left of the center of the field of view;
move up, indicating the center of the person's face is positioned above the center of the field of view;
move down, indicating the center of the person's face is positioned below the center of the field of view; and
centered, indicating the center of the person's face is aligned with the center of the field of view.

14. The computer-implemented method of claim 12, wherein the person's face is not within the field of view depicted in the frame.

15. The computer-implemented method of claim 12, wherein the non-visual output comprises an audio instruction to guide a user to reposition a camera associated with the user device.

16. A computing system comprising:
one or more processors; and
one or more non-transitory computer-readable storage media having instructions stored thereon that, when executed by the one or more processors, cause the computing system to a method comprising:
receiving image data from a user device;
utilizing a trained neural network system to determine a directional assistance category based on a frame within the image data, the directional assistance category indicating a position of a person's face relative to a field of view of the frame, wherein the directional assistance category for the frame is determined based on at least one non-facial feature of the person depicted in the frame, the non-facial feature comprising at least one of hair, an ear, a shoulder, and a neck; and
automatically initiating a non-visual output corresponding to the position of the person's face relative to the field of view.

17. The computing system of claim 16, wherein the person's face is not within the field of view depicted in the frame.

18. The computing system of claim 16, wherein the non-visual output comprises an audio instruction to guide a user to reposition a camera associated with the user device.

* * * * *